US 6,676,134 B1

United States Patent
Wiegert et al.

(10) Patent No.: US 6,676,134 B1
(45) Date of Patent: Jan. 13, 2004

(54) MLS GASKET WITH WIRE RING STOPPER

(75) Inventors: Joel E. Wiegert, Glen Ellyn, IL (US); Frank W. Popielas, Naperville, IL (US); Martin Mockenhaupt, Buffalo Grove, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/107,417

(22) Filed: Mar. 27, 2002

(51) Int. Cl.⁷ .................................................. F02F 11/00
(52) U.S. Cl. ....................................... 277/593; 277/600
(58) Field of Search ................................ 277/600, 601, 277/593, 597

(56) References Cited

U.S. PATENT DOCUMENTS

| | | | |
|---|---|---|---|
| 4,776,601 A | 10/1988 | Yamada | |
| 5,120,078 A | 6/1992 | Udagawa | |
| 5,201,534 A | 4/1993 | Miyaoh | |
| 5,275,139 A | * 1/1994 | Rosenquist | 123/193.3 |
| 5,277,433 A | 1/1994 | Ishikawa et al. | |
| 5,306,023 A | 4/1994 | Udagawa | |
| 5,362,074 A | * 11/1994 | Gallo et al. | 277/592 |
| 5,551,709 A | 9/1996 | Plunkett | |
| 5,803,462 A | 9/1998 | Kozerski | |

* cited by examiner

Primary Examiner—William L. Miller
(74) Attorney, Agent, or Firm—Rader, Fishman & Grauer, PLLC

(57) ABSTRACT

A multi-layer steel cylinder head gasket includes a spacer layer between two beaded mirror image outer layers. A wire ring stopper extends about the boundary of a combustion opening in the stopper layer; the ring is radially spaced from the mirror image beaded outer layer extremities. The ring is covered by a flange folded thereover; the flange extends radially outwardly to overlie the boundary edge of the stopper layer at the combustion opening. The stopper ring pre-stresses the gasket interface at the combustion opening upon securement of a cylinder head to an engine block. Because the stopper ring is spaced from the beaded outer layers, the stresses imposed on the wire ring are decoupled from the beaded outer layers, and lower incidences of bead cracking are realized. In addition, the wire ring diameter is greater than the thickness of the stopper layer, reducing unnecessary compression loads on the stopper layer.

10 Claims, 1 Drawing Sheet

MLS GASKET WITH WIRE RING STOPPER

BACKGROUND OF THE INVENTION

1. Field of Invention

The present invention relates to improvements in gaskets for automotive internal combustion engines. More particularly, the invention relates to MLS cylinder head gaskets having improved stoppers to provide enhanced sealing about combustion apertures of such gaskets.

2. Description of the Prior Art

Those skilled in the art will appreciate the difficulty involved in maintaining a high quality seal between cylinder apertures of an internal combustion engine block and a cylinder head fastened to the block. In recent years, multiple-layered steel (MLS) cylinder head gaskets have become a preferred design choice, wherein all (typically at least three) gasket layers have been formed of steel. Beaded exterior layers have generally been fabricated of 301 stainless steel, a relatively robust metal with a commensurately high spring rate, for meeting requisite performance requirements over the useful life of the gaskets. The center layer, also called a "spacer" layer, has generally been formed of less expensive metals such as 409 stainless steel, or in some cases even zinc-plated plain steel or other low carbon steels, for meeting less rigorous requirements.

The gasket areas immediately adjacent the circumference of engine cylinder bore apertures are subject to considerably greater stresses for assuring proper sealing than areas of the gasket radially remote from the apertures. To meet the greater stress requirements at the aperture areas, so-called stoppers have been employed in areas that circumferentially surround each cylinder aperture boundary. The stoppers are designed to provide increased sealing pressures around areas immediately adjacent the combustion apertures. In some cases the stoppers have been formed of extra layers of metal, consisting either of layers folded over or under primary sealing layers. In other cases, the stoppers have been formed as separately provided discrete annular rings positioned about the aperture boundaries.

Radially outwardly of the stopper, a secondary seal is normally provided. The secondary seal is usually formed as an active spring seal defined by an embossed bead in a primary external metal sealing layer. Two of such embossed axially spaced beads are normally provided in two separate mirror image external layers that sandwich a center or spacer layer. In some cases, the embossed beads employed in such duplicate mirror image primary sealing layers have been prone to cracking at the boundaries of the beads, particularly where metal stoppers have been employed. Stopper dynamics can create stresses on the beads that exceed normal bead deflection stress capability. Resultant cold working and bead cracking are seriously detrimental to both the performance and longevity of cylinder head gaskets capable of otherwise providing reliable combustion gas sealing media.

One commonly used type of stopper that existed before the advent of MLS gaskets is a wire ring stopper. Wire ring stopper structures have been recently applied to MLS gaskets, being formed to lie within the plane of, and radially juxtaposed against, a central unitary metal spacer layer. The combustion sealing beads in multi-layer steel gaskets have a tendency to crack in the vicinity of such wire ring stoppers, however, and may leak combustion gases as a result. Because the wire ring structures have had major difficulty withstanding stresses generated by thermally and dynamically induced vertical motions in MLS gaskets, MLS gaskets employing such wire ring structures have so far been associated with less than satisfactory performance results.

SUMMARY OF THE INVENTION

The disclosed invention provides a unitary, non-metallic circular stopper bead that circumferentially extends about the combustion apertures of an MLS combustion-sealing gasket. The circumferential wire ring offers a potentially more durable, as well as simpler, manufactured gasket.

In one described embodiment, a multi-layered steel cylinder head gasket incorporates the wire ring combustion seal. The gasket is comprised of inner and outer active sealing layers of full-hard stainless steel. Disposed between the inner and outer sealing layers is a low carbon or stainless steel spacer extending partially into a flange. A steel wire ring is disposed entirely within the flange; the flange is not contiguous with the inner and outer sealing layers. The gasket thus incorporates a gap between the flanged portion and the inner and outer active layers that helps to decouple stresses on the wire ring from those on the active layer. Separating the inner and outer active layers from the flanged portion of the gasket helps prevent cracking and enhance sealing. Depending on harshness of the application, either a low carbon or stainless steel wire ring may be employed, the stainless steel ring being preferred under the harshest of environments.

In summary, use of a steel wire ring combustion seal, spaced radially from the active gasket layers, helps to eliminate bead cracking. The wire ring facilitates conformability of the combustion seal, i.e. for sealing a greater range of engine hardware deflection. Localized motions are limited due to the relative robustness of the wire ring. Previous efforts to seal combustion chambers of heavy-duty diesel engines have been fraught with cracking and combustion seal failures. A flanged wire ring, situated in the manner described, is considerably more compliant to stresses applied both laterally and axially, and is thus resistant to cracking.

Finally, an embossed metallic secondary bead is formed radially outwardly of the already described primary stopper layer. The primary and secondary beads are designed to act in concert with each other, wherein the secondary sealing bead provides a backup in case of failure of the primary wire ring, as well as a seal targeted against leakage of engine oil or coolant into the combustion chambers of the engine.

DETAILED DESCRIPTION OF THE EMBODIMENTS

Figure 1:
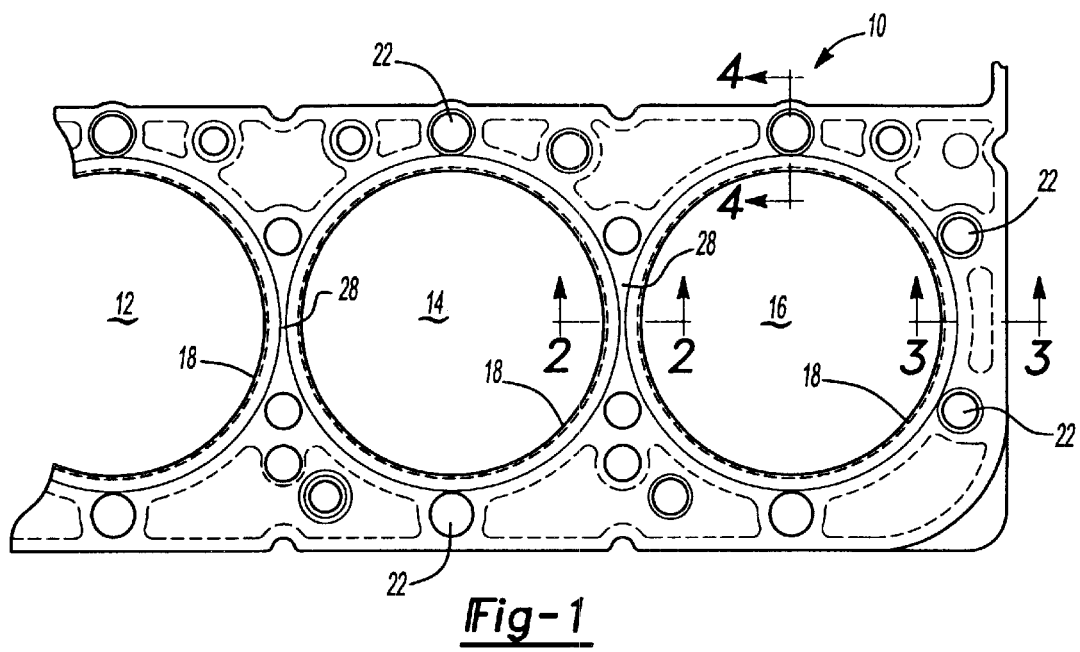
FIG. 1 is a plan view of a one described embodiment of an MLS cylinder head gasket adapted to surround and seal a plurality of engine cylinder bore apertures.

Referring initially to FIG. 1, a metal cylinder head gasket 10 is shown fragmentarily. In the described embodiment, the gasket 10 includes a plurality of layers of steel, and is generally referred to as a multi-layered steel (MLS) gasket, although other metals may be used in some environments.

In sealing between engine blocks and cylinder heads (neither shown), several variables impact the design of a gasket. The engine areas and surfaces to be sealed are rarely uniform in size or shape. In addition, the attachment bolt locations are generally non-symmetrically arranged about the areas of the gasket to be secured. Against the backdrop of this asymmetrical environment, the cylinder bores must be sealed tightly at their boundary edges in order to provide satisfactory performance.

Figure 2:
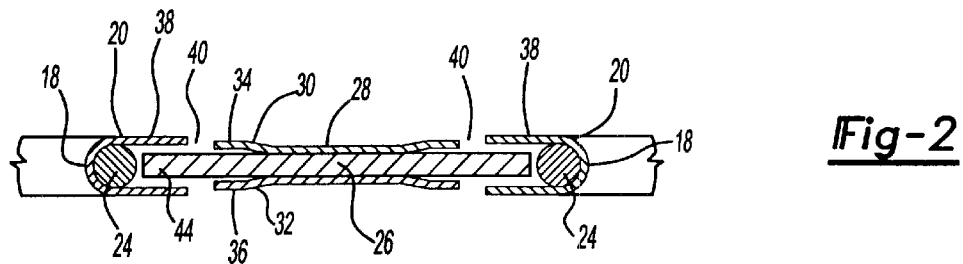
FIG. 2 is a cross-sectional view of the gasket of FIG. 1, taken along lines 2—2 of FIG. 1.
Figure 3:
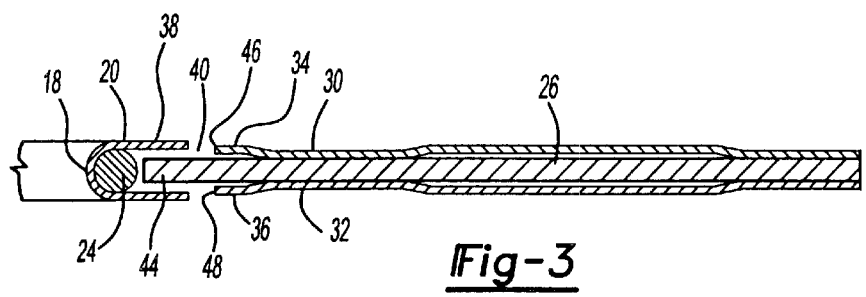
FIG. 3 is a cross-sectional view of the gasket of FIG. 1, taken along lines 3—3 of FIG. 1.
Figure 4:
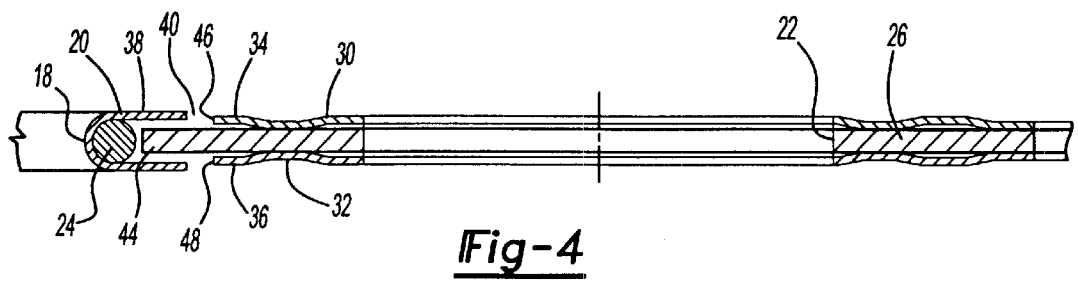
FIG. 4 is a cross-sectional view of the gasket of FIG. 1, taken along lines 4—4 of FIG. 1.

As a result of the described asymmetrical relationships, referring now also to FIGS. 2, 3, and 4, it is preferable that a primary stopper 20 be provided at each cylinder bore boundary of the cylinder head gasket 10 to provide a high sealing stress or pressure about the circumference 18 of each of the cylinder bore apertures 12, 14, and 16 displayed. FIGS. 2, 3, and 4 demonstrate the cross-sections of the primary stopper 20 at various areas of the gasket surrounding the bore apertures. This invention provides an improved mechanism for assuring that adequate pressure is applied via the stopper 20 in a manner designed to avoid premature failure of metallic stopper beads.

Those skilled in the art will appreciate that the gasket 10 includes a plurality of apertures in addition to those of the cylinder bore apertures 12, 14, and 16. Thus, bolt apertures 22 are adapted to secure the gasket in place between noted engine bore and cylinder head structures. Several additional apertures shown comprise unidentified (i.e., unnumbered) coolant (water bore) apertures, and oil apertures, as will also be appreciated by those skilled in the art.

A web area 28 of the gasket 10 (FIGS. 1 and 2) is situated between any two bore apertures 12 and 14, or 14 and 16 (FIG. 1). The area 28 represents a relatively small area that gives rise to traditionally difficult sealing. Thus, it will be appreciated that desired stopper forces may be enhanced in the web area 28 of the cylinder head aperture boundaries 18 by a stopper formed of a wire ring 24 having a diameter greater than the thickness of a spacer layer 26. The spacer layer is interposed between a pair of inner and outer mirror image active (beaded) sealing layers 30, 32 of full-hard stainless steel. The thicknesses (heights) of the beads 34, 36 are generally established by design parameters calculated through finite element analysis for cylinder bore areas of any given cylinder head gasket.

Referring now particularly to FIGS. 3 and 4, cross-sectional views of the gasket 10 are revealed along lines 3—3 and 4—4, respectively, of FIG. 1. As noted, the gasket 10 is comprised of two external layers; a top or upper embossed layer 30, and a mirror image lower or bottom embossed layer 32. Interposed between the external layers 30 and 32 is the center or spacer layer 26 that contains no beads in the described embodiments. However, the spacer layer 26 includes an end portion 44 that extends radially beyond the extremities 46, 48 of the first and second active layers 30, 32.

Those skilled in the art will appreciate that secondary combustion sealing beads 34, 36 of the respective upper and lower active layers 30, 32 act to provide a backup to the stopper 20, as well as a means for preventing engine coolant flow toward the stopper 20, which acts as a primary combustion seal.

Those skilled in the art will further appreciate that the primary stopper 20 is comprised of a wire ring 24 and a U-wrap flange 38 that overlies the wire ring 24. In the described embodiment, the U-wrap flange 38 is spaced from the beads 34, 36 of the active layers 30, 32 by a gap 40. The flange 38 is thus not contiguous with the inner and outer active sealing layers 30, 32. The gap 40 provided between the flanged 38 and the inner and outer active layers 30, 32 helps decouple stresses on the wire ring from those on the beads 34, 36 of the active layers. By separating the inner and outer active layers from the flange 38 of the gasket in this manner, cracking is prevented and sealing is enhanced.

Finally, in the described embodiment, the metal employed for the outer IA layers 30, 32 of the gasket 10 is 301 SAE stainless steel. The interposed spacer layer 26 is formed of 409 stainless or zinc plated low carbon steel. Those skilled in the art will appreciate that the U-wrap flange 38 overlies the wire ring 24 in a manner such that the flange 38 extends part way over the end portion 44 of the spacer layer 26 so as to define the gap 40 between the flange and the first and the second active layers 30, 32.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A multi-layer steel gasket for an internal combustion engine comprising:

first and second external active layers;

a spacer layer disposed between the first and second active layers and having an end portion that extends beyond the first and second active layers;

a flanged portion extending part way over the end portion of the spacer layer so as to form a gap between the flanged portion and the first and the second active layers; and a wire ring disposed within the flanged portion of the gasket adjacent the end portion of the spacer layer.

2. The multi-layer gasket of claim 1, wherein the first and second active layers comprise metal layers, each of said metal layers containing a sealing bead.

3. The multi-layer gasket of claim 2, wherein said sealing beads are disposed in a mirror image arrangement, wherein said spacer layer is interposed between them.

4. The multi-layer gasket of claim 3, wherein said flanged portion comprises a U-shaped member containing said wire ring.

5. The multi-layer gasket of claim 4, wherein said end portion of said spacer layer extends into said U-shaped member.

6. A multi-layer steel gasket for an internal combustion engine comprising:

first and second external active layers, each defining an aperture sharing a common axis;

a spacer layer disposed between the first and second active layers, said spacer layer defining an aperture sharing said axis, said spacer layer having an end portion that extends radially beyond extremities of said first and second active layers;

a flanged portion extending part way over the end portion of the spacer layer so as to form a gap between the flanged portion and the extremities of said first and the second active layers; and a wire ring disposed within the flanged portion of the gasket adjacent the end portion of the spacer layer.

7. The multi-layer gasket of claim 6, wherein said each of said first and second active sealing layers comprises a metal bead.

8. The gasket of claim 7 wherein each of said layers active sealing layers comprises a stainless steel material.

9. The gasket of claim 8 wherein said spacer layer comprises a plain carbon steel.

10. The gasket of claim 9 wherein said wire ring comprises a plain carbon steel, and said flanged portion comprises a stainless steel material.

* * * * *